(12) United States Patent
Karaoguz et al.

(10) Patent No.: US 7,114,010 B2
(45) Date of Patent: Sep. 26, 2006

(54) MULTI-MODE CONTROLLER

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 609 days.

(21) Appl. No.: 09/866,546

(22) Filed: May 25, 2001

(65) Prior Publication Data

US 2002/0059434 A1   May 16, 2002

Related U.S. Application Data

(60) Provisional application No. 60/238,833, filed on Oct. 6, 2000, provisional application No. 60/214,620, filed on Jun. 28, 2000.

(51) Int. Cl.
*G06F 15/16* (2006.01)
*G06F 15/177* (2006.01)

(52) U.S. Cl. .................. 709/250; 709/220; 709/230

(58) Field of Classification Search ............... 709/220, 709/230, 250; 710/8, 11; 370/462–464, 370/254; 455/401, 421, 454
See application file for complete search history.

(56) References Cited

U.S. PATENT DOCUMENTS

| | | | | |
|---|---|---|---|---|
| 5,355,517 | A * | 10/1994 | Olson | 455/510 |
| 5,546,211 | A * | 8/1996 | Devon | 398/98 |
| 5,903,548 | A * | 5/1999 | Delamater | 370/310 |
| 6,038,400 | A * | 3/2000 | Bell et al. | 710/11 |
| 6,374,112 | B1 * | 4/2002 | Widegren et al. | 455/452.2 |
| 6,600,726 | B1 * | 7/2003 | Nevo et al. | 370/278 |
| 6,697,638 | B1 * | 2/2004 | Larsson et al. | 455/553.1 |
| 2001/0056502 | A1 * | 12/2001 | Hollstrom et al. | 709/250 |
| 2002/0012329 | A1 * | 1/2002 | Atkinson et al. | 370/330 |
| 2002/0022453 | A1 * | 2/2002 | Balog et al. | 455/41 |

FOREIGN PATENT DOCUMENTS

| | | |
|---|---|---|
| EP | 1 119 137 A1 | 7/2001 |
| WO | WO 96/28947 | 9/1996 |
| WO | WO 99/29126 | 6/1999 |
| WO | WO 01 35578 A1 | 5/2001 |

OTHER PUBLICATIONS

William Stallings, Operating Systems—Internals and Design Principles, Prentice Hall, 4th Ed. pp. 402, 406-408.*
Negus, K.J., et al., "*Home RF TM and Swap Wireless Networking for the Connected Home*", Mobile Computing and Communications Review, vol. 2 No. 4, pp. 28-36. XP000786057.

(Continued)

*Primary Examiner*—Fritz Fleming
*Assistant Examiner*—David Martinez
(74) *Attorney, Agent, or Firm*—McAndrews, Held & Malloy, Ltd

(57) ABSTRACT

Techniques for controlling and managing network access are used to enable a wireless communication device to selectively communicate with several wireless networks. A portable communication device constructed according to the invention can communicate with different networks as the device is moved through the areas of coverage supported by the different networks. As a result, the device can take advantage of services provided by a particular network when the device is within the area of coverage provided by that network. Thus, the device can selectively switch to networks that provide, for example, high speed Internet access, different quality of service, low cost service and/or different services (e.g., voice, data, multimedia, etc.). A multi-mode controller in the device may be used to alternately poll different networks to determine whether the device is within the area of coverage of a network and to selectively establish communications with those networks.

23 Claims, 12 Drawing Sheets

OTHER PUBLICATIONS

Kamerman, A., et al. *"WaveLAN-II: A High-Performance Wireless LAN for the Unlicensed Band"*, Bell Labs Technical Journal, vol. 2, No. 3, Jun. 21, 1997, pp. 118-133. XP000703744.

Haartsen J.C., *"The Bluetooth Radio System"*, IEEE Personal Communications, Feb. 2000, pp. 28-36. XP000908653.

International Search Report, Aug. 19, 2002.

* cited by examiner

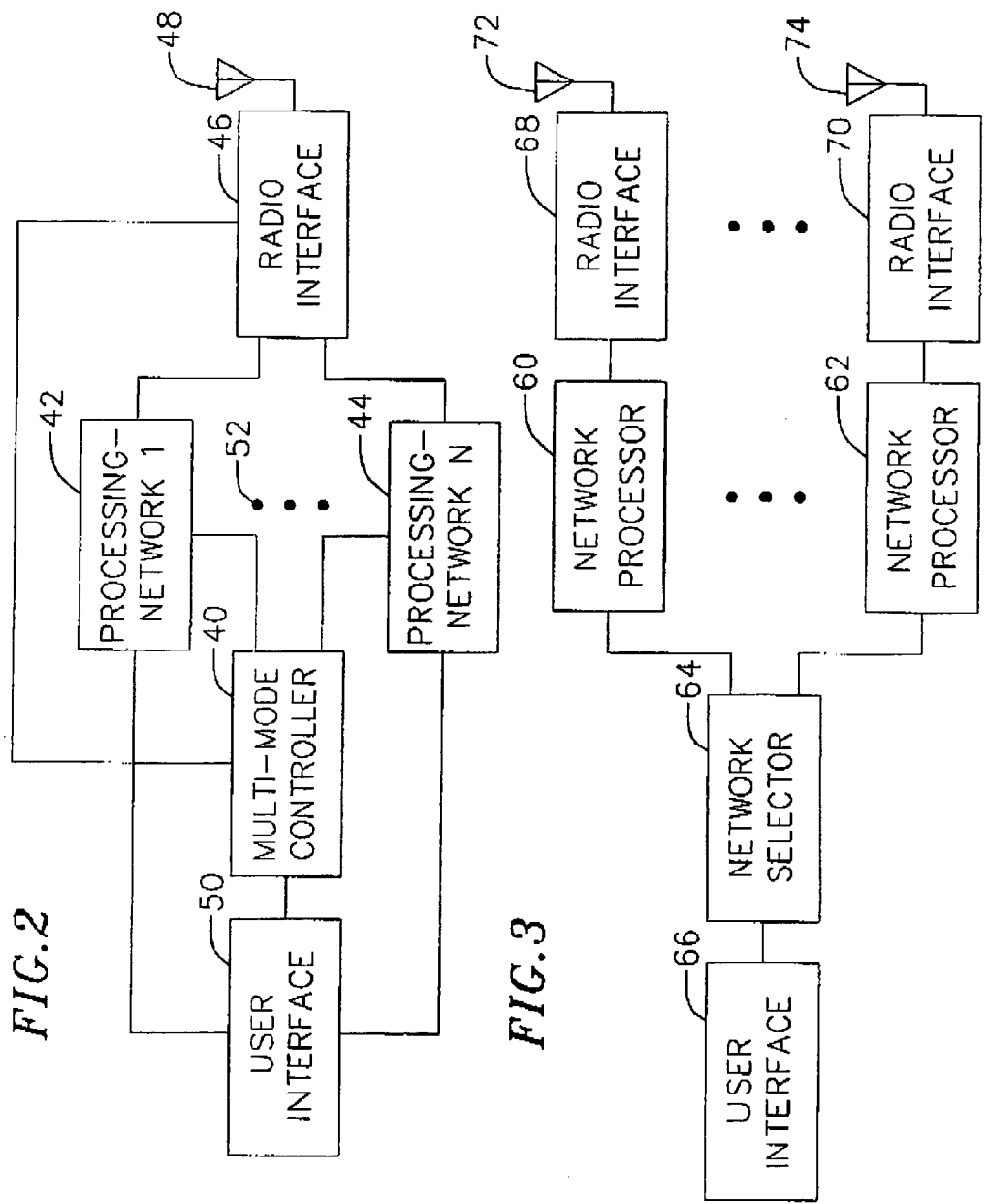

MULTI-MODE CONTROLLER

CROSS-REFERENCE TO RELATED APPLICATION(S)

This application claims the benefit of U.S. Provisional Application No. 60/214,620, filed Jun. 28, 2000 and U.S. Provisional Application No. 60/238,833, filed Oct. 6, 2000.

FIELD OF THE INVENTION

The invention relates generally to data communications and, more particularly, to systems and methods for controlling and managing network access in wireless communication systems.

BACKGROUND OF THE INVENTION

Demand for wireless information services had led to the development of an ever increasing number of wireless network standards. For example, cellular and PCS networks, to name just two, provide wide area wireless telephone and data services. As the demand for these services increases, portable communication devices such as personal digital assistants (PDAs) are evolving to support integrated voice, data, and streaming media while providing seamless network coverage from personal area networks (PAN) to wide area networks (WAN). On the wireless WAN side, the prevailing standards are 2G+, 3G and 4G, among others. On the wireless PAN and local area networks (LAN) side, Bluetooth, HomeRF, and IEEE 802.11b standards are emerging as important standards. A Bluetooth network may provide data connectivity between devices such as personal computer and personal digital assistants (PDAs) that are in relatively close proximity to one another. A HomeRF network may provide wireless services at relatively high data rates over a small area of coverage such as a person's home.

Boundaries between wireless WANs (including cellular networks) and LANs (e.g., home wireless LANs and other small pockets of wireless networks) are essentially disappearing as customers demand seamless continuation of service for their mobile communication device as they travel from their PAN to home network and further into the WANs.

However, in general, devices that are compatible with one wireless network are incompatible with other wireless networks. This is due, in part, to each network's use of its own unique set of protocols for facilitating communication between compatible devices.

Moreover, each network typically provides a unique set of services. Networks may provide different data transmission rates, for example, a GSM cellular telephone network typically supports data transfer rates of 64 kilobits per second (kbit/s) while a HomeRF network may support data transfer rates of 2–10 megabits per second. Networks also may provide service having different areas of coverage. For example, cellular networks provide coverage on a continental scale while Bluetooth networks typically provide coverage over the range of approximately 10 meters. Networks also may provide different information content to a user of the network. Legacy cellular telephone networks simply provided voice services. Newer networks such as PCS networks may support voice, data and other information services.

In effect, these disparate networks have created a series of islands of wireless service throughout the geographical landscape, each with its own unique set of protocol standards, data rates, areas of coverage and services. Yet there are no single wireless technologies or standards that effectively satisfy the requirements of desired coverage area (from PAN to WAN) and quality of service (high bandwidth data, voice, and streaming media) for mobile multimedia devices.

SUMMARY OF THE INVENTION

The invention is directed to systems and methods for enabling a wireless communication device to communicate with a variety of wireless networks. In particular, a portable communication device constructed according to the invention can communicate with different networks as the device is moved through the areas of coverage supported by the different networks. To this end the invention provides techniques for controlling and managing network access to several networks. As a result, a device constructed according to the invention can take advantage of services provided by a particular network when the device is within the area of coverage provided by that network. For example, when the device is within the area of coverage of a network that provides high speed Internet access, the device may switch from the network with which it was connected to the network with the high speed Internet access. Similarly, the device may, for example, connect to networks that provide different quality of service, low cost service and/or different services (e.g., voice, data, multimedia, etc.).

In one embodiment, the invention relates to systems and methods for implementing multi-mode wireless communication devices such as PDAs or multi-function (e.g., data, voice, and multimedia) mobile phones that best take advantage of the wireless networks in their proximity. That is, in the case where a nearby wireless network (WAN, LAN, or PAN) happens to provide more data bandwidth and/or better quality of service (QoS), a multi-mode wireless device may switch to that particular wireless network to access these services. Several network coverage scenarios include, for example:

(1) a PDA or a multi-function mobile phone connected to a low bandwidth internet service while located within a WAN could take advantage of a broadband internet service while located at home through a wireless LAN;

(2) a cellular phone could switch to a cordless telephone mode when at home to make calls over the wired infrastructure to avoid air-time charges;

(3) a PDA or a multi-function cell phone traveling through a WAN may encounter an island of high bandwidth wireless coverage (Bluetooth, HomeRF, 802.11b, etc.) in which case it could switch to a Bluetooth, HomeRF, or 802.11b mode to access the provided services;

(4) A Bluetooth enabled mobile WAN device may recognize and establish connection with a nearby HomeRF network; and (5) A Bluetooth enabled mobile WAN device WAN device may recognize and establish connection with a nearby IEEE 802.11b network.

One embodiment of a system constructed according to the invention consists of a multi-mode controller that, in effect, simultaneously processes communication signals for several wireless networks. The multi-mode controller processes signals to detect the presence of network services and, in the event services are detected, selectively establishes communications between the device and the network.

One embodiment of a system constructed according to the invention consists of a dual-mode Bluetooth and HomeRF controller. The dual-mode controller, in effect, simultaneously generates polling signals and scans for polling signals to detect the presence of Bluetooth and HomeRF network services. In the event such services are detected, the device selectively establishes communications between the device and one of the two networks.

One embodiment of a system constructed according to the invention consists of a dual-mode Bluetooth and IEEE 802.11b controller. The dual-mode controller, in effect, simultaneously generates polling signals and scans for polling signals to detect the presence of Bluetooth and IEEE 802.11b network services. In the event such services are detected, the device selectively establishes communications between the device and one of the two networks.

BRIEF DESCRIPTION OF THE DRAWINGS

These and other features, aspects and advantages of the present invention will be more fully understood when considered with respect to the following detailed description, appended claims and accompanying drawings, wherein:

FIG. 2 is a block diagram of one embodiment of a multi-mode radio transmitter/receiver constructed in accordance with the invention;

FIG. 3 is a block diagram of one embodiment of a multi-mode radio transmitter/receiver constructed in accordance with the invention;

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
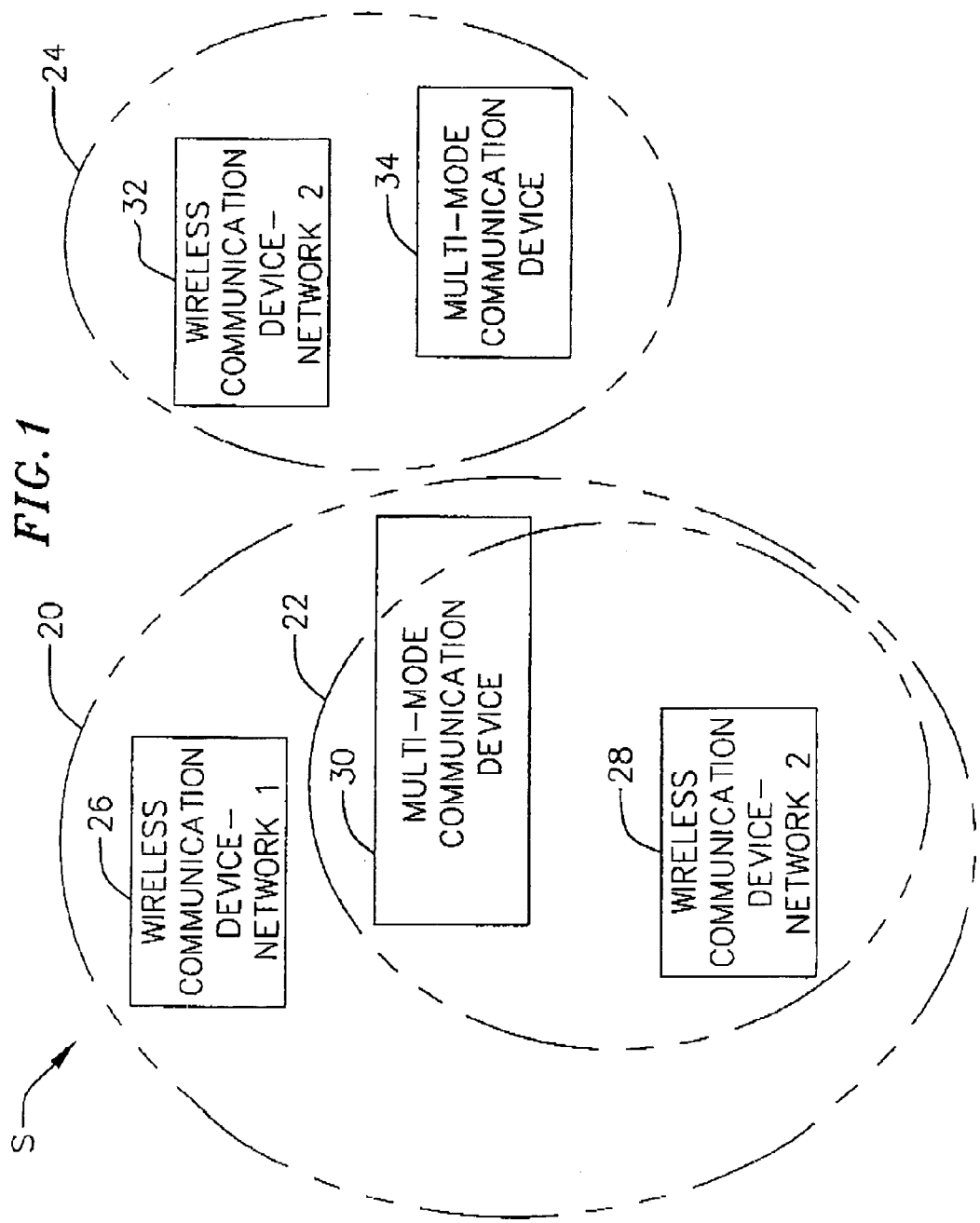
FIG. 1 is a graphical representation of one embodiment of wireless communication networks defining different areas of coverage wherein a device constructed according to the invention may establish communication with one or more of the wireless communication networks.

FIG. 1 is a simplified graphical representation of a communications system S defined by several wireless networks. Dashed lines 20, 22 and 24 represent hypothetical areas of coverage for a few representative wireless networks. In this embodiment, wireless communication device 26 is associated with one network (designated network 1) and its associated area of coverage 20. Similarly, wireless communication devices 28 and 32 are associated with another type of network (designated network 2) where each wireless communication device 28 and 32 is associated with a distinct area of coverage 22 and 24, respectively.

In accordance with one embodiment of the invention, multi-mode communication devices 30 and 34 may communicate with one or more of the wireless communication devices 26, 28 and 32. Essentially, each multi-mode communication device 30 or 34 determines whether it is within the area of coverage of a type of network that is supported by the multi-mode communication device. For example, as multi-mode communication device 30 moves from a location outside of area 22 to a location within area 22, the device 30 may selectively establish communications with a device in the wireless network represent by area 22 (e.g., device 28).

Depending on the location of a multi-mode communication device 30 or 34, the device 30 or 34 may be in an area of coverage for zero, one, two or more networks. Hence, in some situations the device 30 or 34 may need to select a network to which it will connect. As will be discussed in detail below, the decision to connect to a network may be based on different factors including, for example, the data transfer rates provided by the networks.

Typically, the devices depicted in FIG. 1 and discussions in the sections that follow are portable devices. However, it should be understood that the teachings of the invention may be applied to stationary devices in some applications.

FIG. 2 is a simplified block diagram illustrating certain components of a multi-mode communication device that may operate with two or more wireless networks. A multi-mode controller 40 controls and manages network access to the wireless networks for the communication device. Processing elements 42 and 44 perform the signal processing associated with a given network. As represented by ellipses 52, any number of processing elements for any number of networks may be supported, consistent with the teachings of the invention. Thus, the designation "N" for processing element 44 may represent the Nth network supported by the communication device.

The multi-mode controller 40 and the processing elements 42 and 44 communicate with the network via a radio interface 46. The radio interface transmits and receives signals (e.g., radio frequency signals such as microwave signals and those in the cellular and PCS bands) to other devices in a network via an antenna 48.

A user interface 50 enables a user (not shown) to transmit and receive information to and from a selected network via the corresponding processing elements 42 or 44 and the radio interface 46.

FIG. 3 is a block diagram that represents network selection operations that may be performed in accordance with the invention. In some instances, a multi-mode communication device will select one of two or more available networks. To this end, the device may selectively route information to/from a user interface 66 from/to another device in the selected network. Thus, information will be routed to/from an appropriate network processor element 60 or 62. This selection may be based on many factors. The device may select a network with, for example, 1) a higher bandwidth; 2) a broader area of coverage; 3) less expensive connection costs; 4) different QoS; or 5) better services (e.g., Internet access, multi-media access, etc.).

In one embodiment, a network selector 64 may consist of a hard switch (e.g., a multiplexor) that routes signals from one component to another. In another embodiment the functions of the network selector 64 may be accomplished using routing software that routes the information to an appropriate hardware component or a software subroutine. In the latter case, the network processing operations may take the form of software routines, whereby the multi-mode controller may control execution of the appropriate routine for the selected network. In this case, the information would then be routed to the enabled routine. Such an embodiment typically would be used in an implementation where the multi-mode controller and network processing functionality is performed by a common processing element such as a digital signal processor.

FIG. 3 also illustrates that in some embodiments different radio interfaces 68 and 70 may be use for interfacing with different networks. Also, several antennae may be used in some applications.

Figure 4:
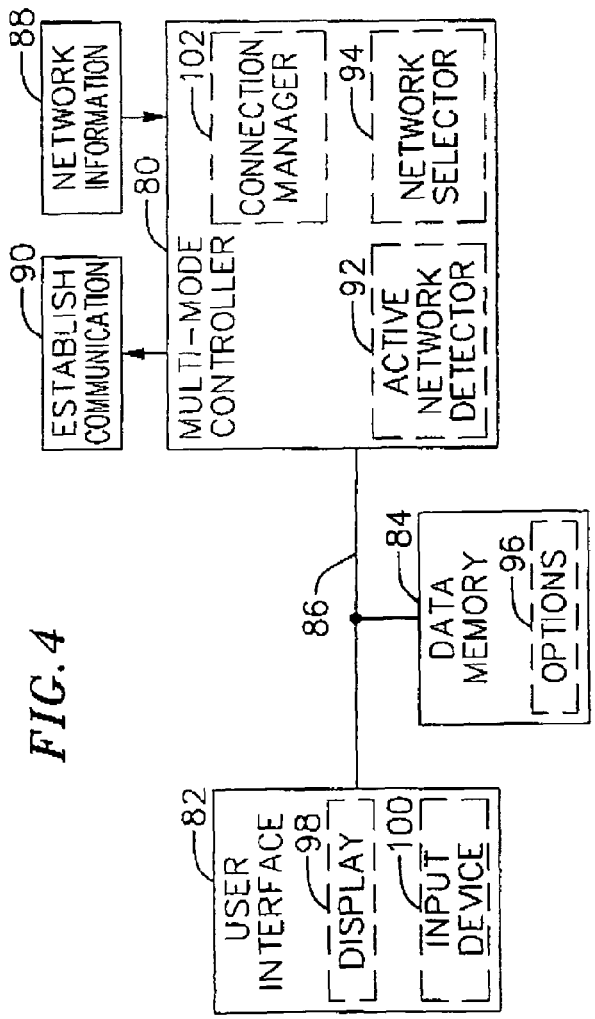
FIG. 4 is a block diagram of one embodiment of a multi-mode controller and user interface in accordance with the invention.

FIG. 4 further illustrates operations related to selecting a network. A multi-mode controller 80 receives network information 88 indicative of whether the device is within range of a supported network. An active network detector 92 processes the received network information to determine whether the device is within range of a supported network. In some embodiments, network detection involves sequentially sending and/or scanning for network polling information associated with each network.

A network selector 94 may be used to determine whether to connect to a detected network. In some instances the device may be configured to only connect to certain types of networks. In other instances the device may be configured to choose between two or more detected networks.

In practice, the decision to select a particular network may be based on a variety of factors. A given network may provide better quality of service than another network. One network may provide faster rates of data transfer. One network may provide less congestion. A network may be less expensive to use. A network may provide content (e.g., Internet access) that another network does not provide. One network may provide information services (e.g., voice, data, multimedia) that are not provided by another network.

Many different schemes may be used to connect to a given network. For example, a device constructed according to the invention may query the user so that the user can decide whether to connect to a particular network. For example, the multi-mode controller may send a message that is displayed on a display 98 in the user interface 82. The user may then use an input device 100 to send instructions to the multi-mode controller 80 regarding the user's selection.

Alternatively, a device constructed according to the invention may automatically connect to a network. In the embodiment of FIG. 4, a data memory 84 may include information 96 that indicates, for example, that the device should: 1) never connect to a particular network; 2) always connect to a particular network if that network is detected; 3) prompt the user of the device for input as to whether the user wishes to connect to the network; and/or 4) connect to the network depending on other options. Examples of options in the last category (number four) include a switch on the device indicative of the user's preference under certain conditions or comparison of the service (e.g., available bandwidth, quality of service, networks costs) available from each network.

Once a network has been selected, a connection manager 102 establishes communication with the network by, for example, causing the appropriate network processor 60 or 62 (FIG. 3) to send the necessary signals to another device in the network (as represented by block 90).

One embodiment of the invention relates to a method for a multi-mode wireless communication device to access and take advantage of the proximity wireless network that best satisfies its service needs. In particular, this embodiment includes a dual-mode wireless network chip set architecture that combines wireless PAN and LAN functions. The dual-mode operation is achieved by a device called a dual-mode controller (DMC) which controls and manages network access to a nearby PAN or a LAN.

Figure 5:
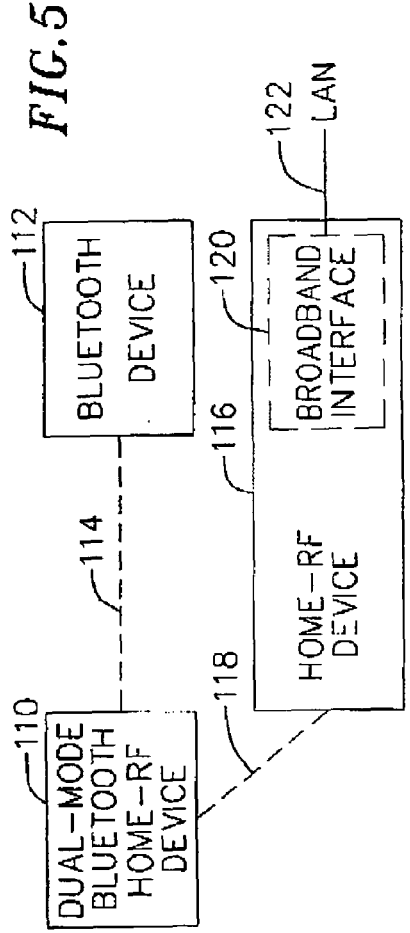
FIG. 5 is a graphical representation of one embodiment of a communications system including Bluetooth and HomeRF networks wherein a device constructed according to the invention may establish communication with the Bluetooth and HomeRF networks.

FIG. 5 depicts one embodiment of the invention that enables a device to utilize Bluetooth and HomeRF networks. Central to this embodiment is a Bluetooth and HomeRF dual mode controller as discussed in more below.

A Bluetooth network is categorized as a personal area network (PAN). PANs such as Bluetooth typically have a range on the order of ten meters. Conventionally, Bluetooth devices support data transfer rates in the range of 1 Mbit/s. Current Bluetooth specifications include Bluetooth versions 1.0 and 1.1.

In some instances, Bluetooth networks may be used in ad hoc peer-to-peer communications. Examples of communications over a Bluetooth network may include data transfers between a PDA and a nearby laptop computer or between a digital camera and a personal computer. In addition, an MP3 player may communicate with a computer or "juke box" over a Bluetooth network.

A HomeRF network is categorized as a local area network (LAN) and, as such, typically supports communications over a area of coverage of approximately 100 meters. Conventional HomeRF devices support data transfer rates on the order of two to ten Mbit/s. Current HomeRF specifications include the Shared Wireless Access Protocol Specification, versions 1.3 and 2.0.

Typically, a wireless PAN connects to a backbone that provides data connectivity to other networks. For example, a wireless PAN interface may connect to a T1 line to provide Internet connectivity. Alternatively a cable modem may include a wireless PAN interface that provides LAN connectivity to wireless devices that are within close proximity to the cable modem.

Significantly, both Bluetooth and HomeRF incorporate frequency hopping. Thus, in this embodiment of the invention a portion of the RF front end may be effectively shared by the two networks. That is, some of the same circuits in the RF front end are used when the device is communicating with other Bluetooth devices or with other HomeRF devices.

Referring now to FIG. 5, for purposes of explanation, an embodiment of a dual-mode mobile communication device 110 capable of accessing either Bluetooth network devices 112 or HomeRF network devices 116 will be described in the context of a residential gateway (e.g. a cable modem with a HomeRF wireless LAN interface 120). The residential gateway may provide a multi-user user broadband internet access service and multi-channel cordless telephony via HomeRF interface. A PDA or a mobile phone with a dual-mode Bluetooth-HomeRF capability could switch to a HomeRF mode upon entering a home to take advantage of the broadband internet access service, or multi-channel cordless telephony service to avoid airtime charges while making a call.

Figure 6:
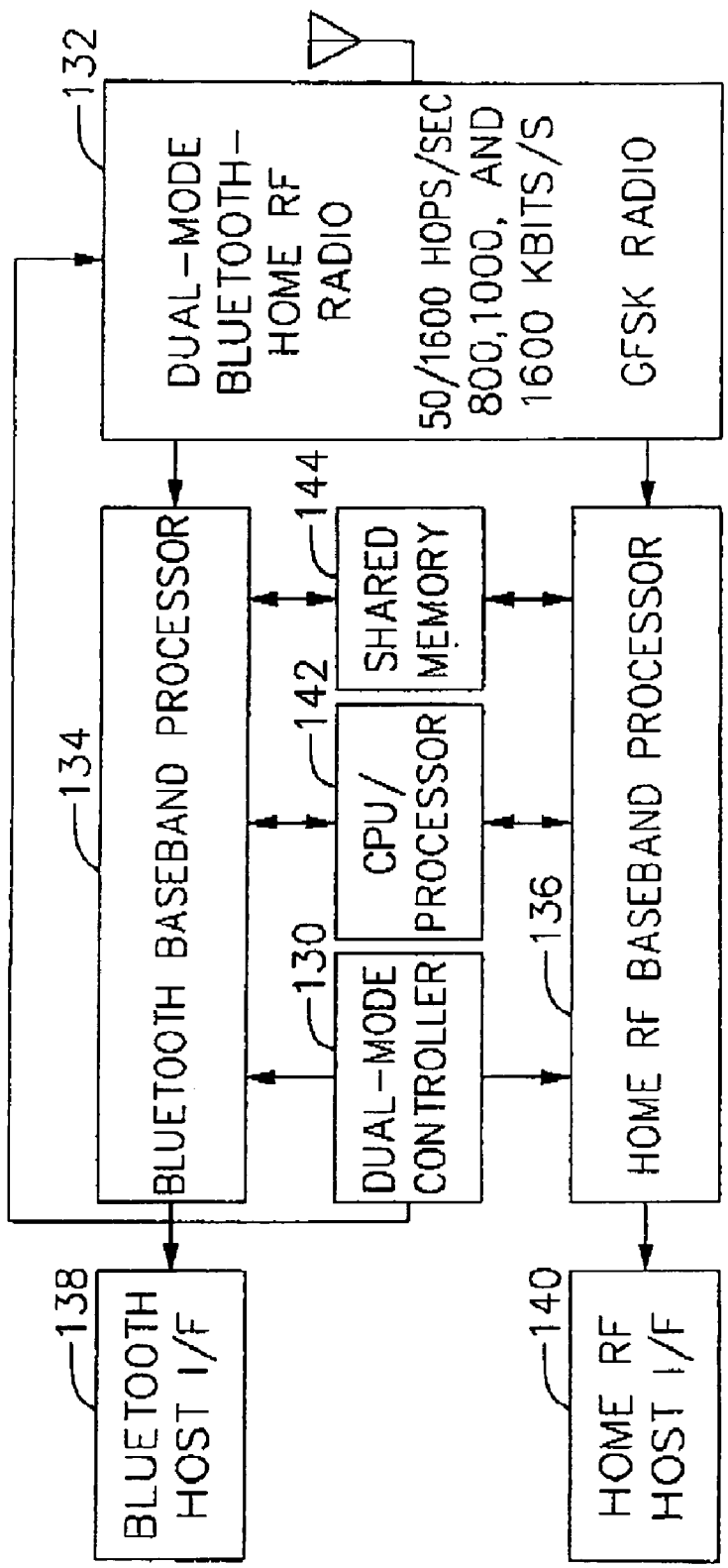
FIG. 6 is a block diagram of one embodiment of a dual mode Bluetooth and HomeRF radio transmitter/receiver constructed in accordance with the invention.

In FIG. 6, a chip architecture that provides this dual-mode functionality is illustrated. A dual-mode radio front-end 132 can be shared with different frequency hopping and modulation rate parameters between Bluetooth and HomeRF modes of operation. To achieve a dual-mode operation, a new timing mechanism (and respective state machines) is used since both Bluetooth and HomeRF are time-synchronous networks. A dual-mode controller 130 implements this timing mechanism and the state machines to achieve the dual-mode operation.

The dual-mode controller 130 has the following operational modes:
Bluetooth-only mode
HomeRF-only mode
Dual Bluetooth-HomeRF mode In this embodiment, all three modes are set by an external user command. In the Bluetooth-only or HomeRF-only mode, the device operates in the native Bluetooth or HomeRF mode, respectively, i.e., whichever mode the device is in the other mode would be turned off. In the dual Bluetooth-HomeRF mode, Bluetooth and HomeRF baseband processors 134 and 136, respectively, time-share the dual-mode radio front-end 132 under the time-synchronous management of the dual-mode controller 130.

Figure 7:
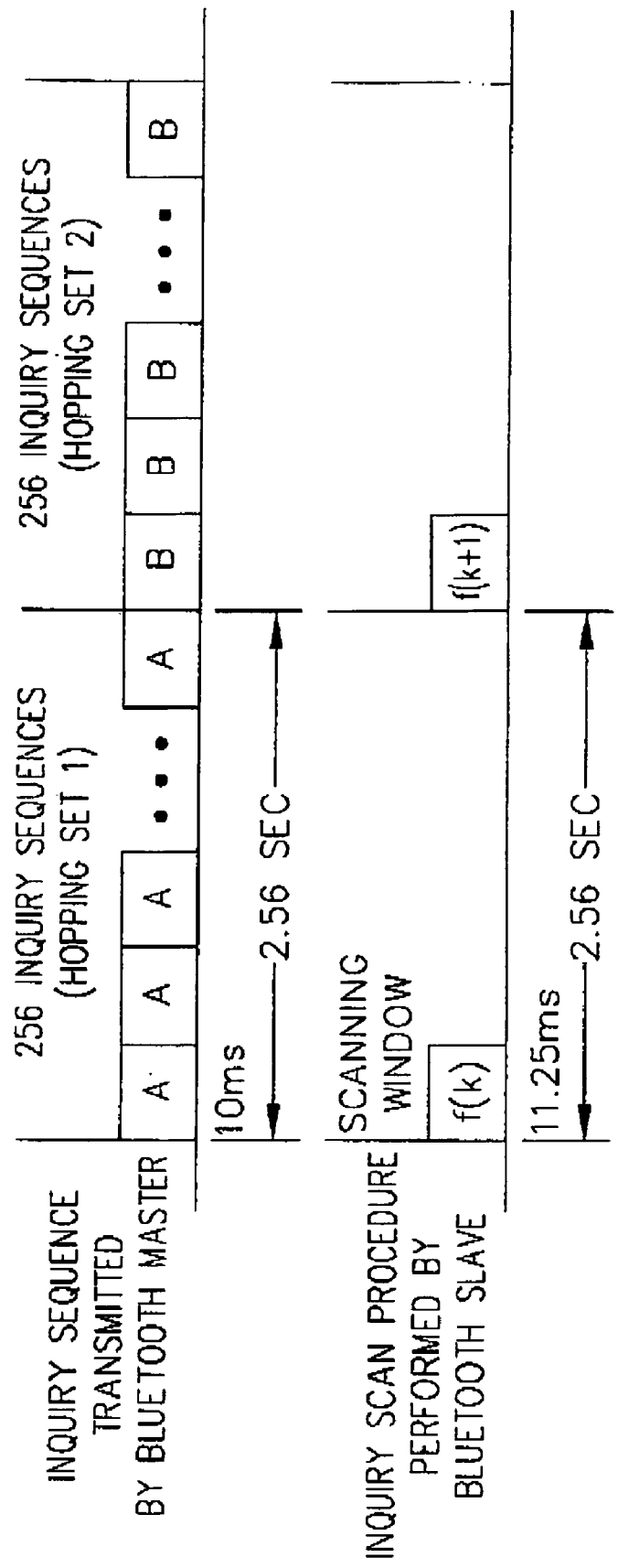
FIG. 7 is a graphical representation of a Bluetooth network access procedure.

The role of the dual-mode controller 130 may be better understood by first explaining the native Bluetooth and HomeRF network access mechanisms. FIG. 7 illustrates what is called "inquiry scan procedure" used by new Bluetooth devices to access a nearby Bluetooth network. A Bluetooth master device (by default the first device that formed a Bluetooth network) sends a train of special inquiry sequences to probe if there are any new Bluetooth devices in the vicinity. The special inquiry sequences denoted by "A" and "B" each contain 8 frames where each frame is of time duration 1.25 ms and consists of a master-to-slave transmission slot (0.625 msec) and a slave-to-master transmission slot (0.625 msec). In every master-to-slave transmission slot, the master sends an inquiry access code on two consecutive hopping frequencies, thereby, covering 16 hopping frequencies for every 8 frames that make up the inquiry sequence "A." As shown in FIG. 7, the inquiry sequence "A" is repeated 256 times. There are a total of 32 predetermined hopping frequencies allocated to the inquiry procedure. In the event that no inquiry response is received by the master during the first 2.56 sec interval, the remaining set of 16 hopping frequencies are used in transmitting another train of inquiry sequences denoted by "B" as shown in FIG. 7.

New devices entering a Bluetooth network scan for inquiry sequences transmitted by a master device. The inquiry scan mechanism is also shown in FIG. 7. A new device scans the RF spectrum at a single hopping frequency for 11.25 ms in every 2.56 seconds interval. For each new scanning window, a new hopping frequency is selected based on a predetermined frequency hopping sequence. Upon receiving a valid inquiry code sequence, the new unit picks a random number N<64 and continues to search for inquiry messages on the same hopping frequency. The unit then transmits an inquiry response message (containing the unit's access ID and other parameters) in the Nth slave-to-master slot corresponding to the master-to-slave slot that carried a valid inquiry code. Sending an inquiry response message at a randomly chosen slave-to-master slot reduces the probability of collision for transmissions by multiple new units responding to the same inquiry access code. The bound on the random number N is chosen such that the inquiry response message is sent to the master unit within the same train of inquiry code sequences "A" or "B". Once the master unit receives an inquiry response message, the actual connection set up procedure is performed.

Figure 8:
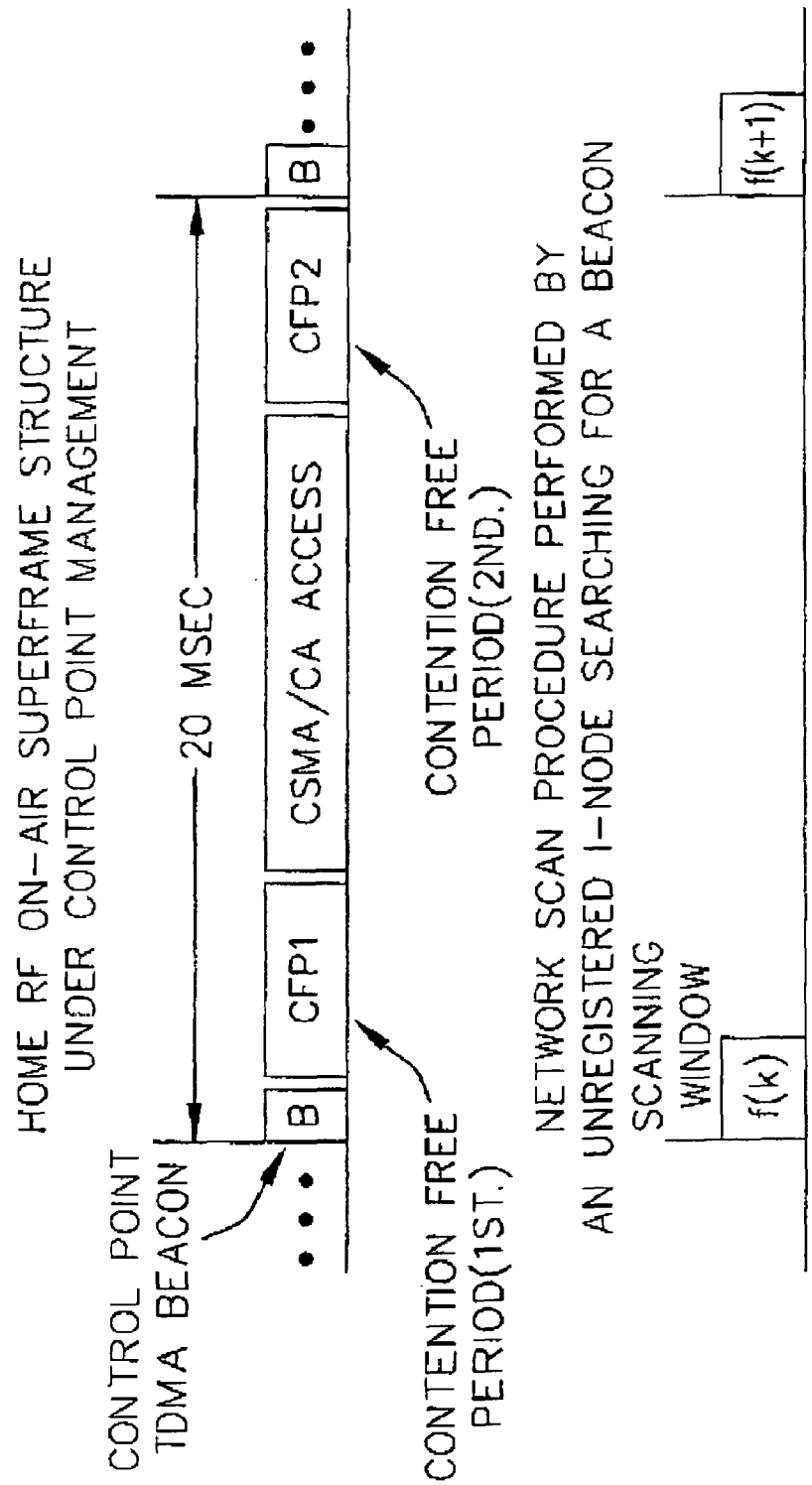
FIG. 8 is a graphical representation of a HomeRF network access procedure.

FIG. 8 describes the HomeRF network scan procedure for a new isochronous device (called I-node) to join a HomeRF network managed by a Control Point (CP). In this case, the CP transmits a distinctive TDMA beacon every 20 msec at the beginning of each superframe. The superframe duration (20 msec) is based on the frequency hopping rate (50 hops/sec), i.e., each superframe is sent at a different hopping frequency. The beacon contains specific information about joining the HomeRF network. A new I-node performs a network scan procedure to search for a CP beacon on one of the three predetermined network scan frequencies for 1.52 seconds.

Unless a beacon is received, all three scan frequencies are tried (each for 1.52 sec) in search of a CP beacon. If a TDMA beacon is received within the scanning window, the new I-node then extracts the network identity information and the timing information from the beacon to join the HomeRF network.

Figure 9:
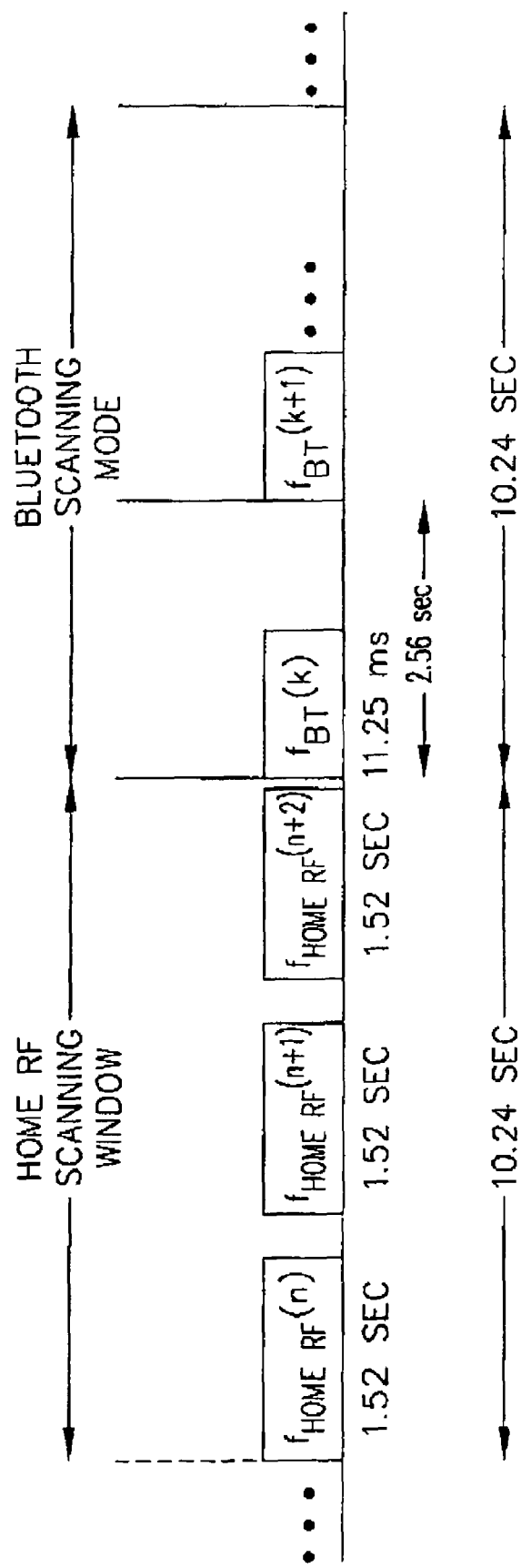
FIG. 9 is a graphical representation of one embodiment of a dual-mode Bluetooth and HomeRF network access procedure in accordance with the invention.

HomeRF network access mechanism for a new device is somewhat similar to the Bluetooth network access mechanism. In both cases, the new device seeking admission into the network starts a network scan procedure searching for a special message from a master unit (for a HomeRF network, the master is the CP). This similarity establishes the basis for the operation of the dual-mode controller device. For a dual-mode Bluetooth-HomeRF communication device, the dual-mode controller manages the network access mechanism for both Bluetooth and HomeRF networks in a synchronous manner. A general illustration of the time interleaved access procedure is shown in FIG. 9.

Figure 10:
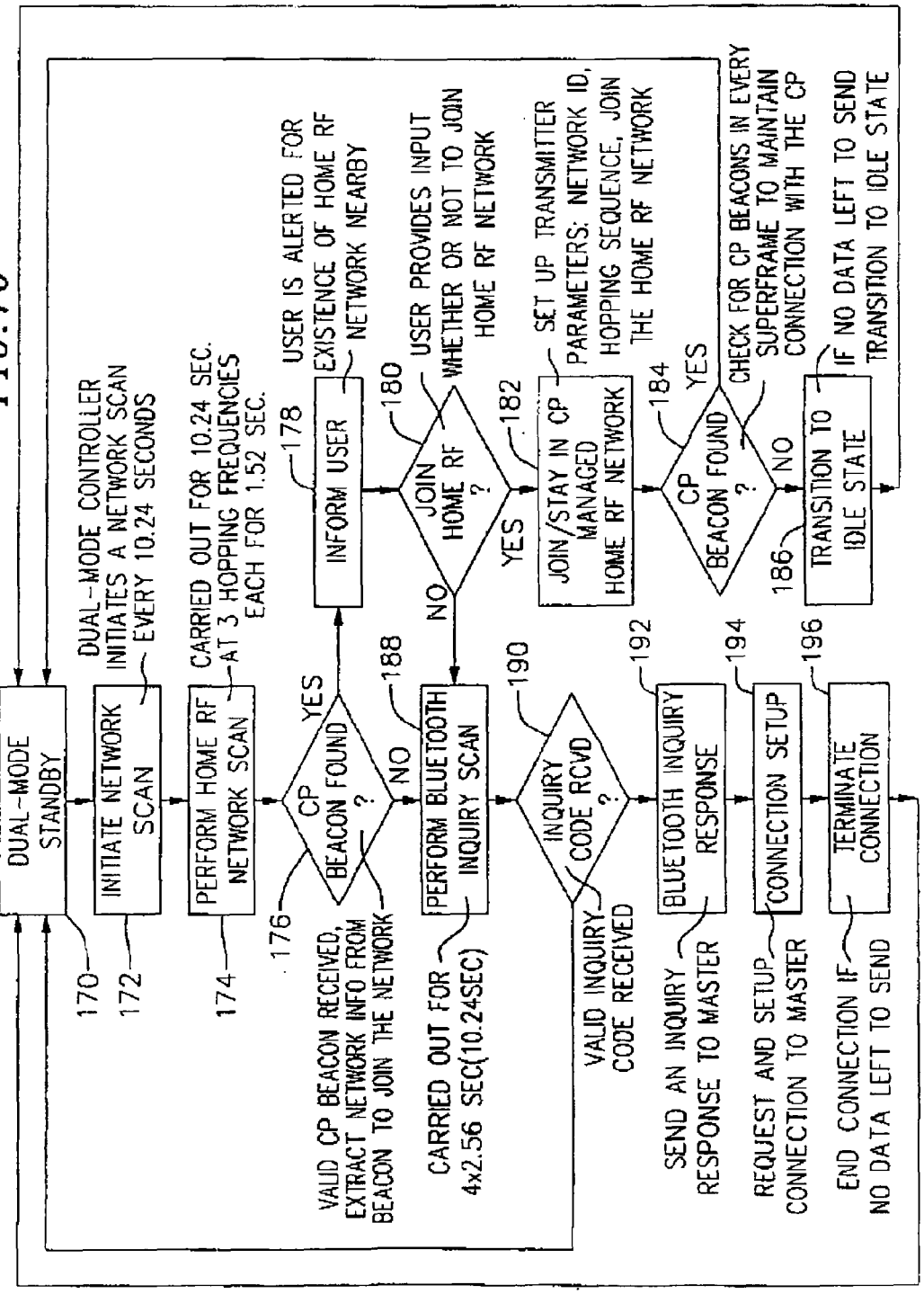
FIG. 10 is a flowchart representative of one embodiment of a Bluetooth and HomeRF dual-mode controller state transition diagram in accordance with the invention.

The dual-mode controller (DMC) device includes a new synchronous state machine that combines the standby, inquiry scan, network scan, and connection procedures carried out by Bluetooth and HomeRF devices. The dual-mode Bluetooth-HomeRF devices interoperate with standards based on Bluetooth-only or HomeRF-only devices. Network scan and connection setup procedures for a dual-mode device should follow the same rules as specified in the Bluetooth or HomeRF standards. In other words, dual-mode operation of the described embodiment should not alter the synchronous time flow of interdependent states (idle, network scan, scan response, etc.) that accomplish the respective network access procedures for Bluetooth or HomeRF networks. The exemplary dual-mode controller is configured such that Bluetooth and HomeRF network access state machines are combined without individually altering their functionalities. Detailed description of the dual-mode controller state machine is illustrated in FIG. 10.

The default state for the dual-mode controller is the standby mode 170. In the absence of any network connection, the dual-mode controller initiates a new network scan request 172 every 10.24 seconds. The very first network scan performed by the dual-mode controller searches for a HomeRF network (block 174). In this state, a new device performs a network scan procedure on one of the three HomeRF network scan frequencies for 1.52 sec searching for a CP beacon. Unless a beacon is received (block 176), all three scan frequencies are tried (each for 1.52 sec) in search of a CP beacon as shown in FIG. 9. Total duration of the HomeRF network scan procedure is 10.24 seconds. If a TDMA beacon is received within the scanning window, the new unit extracts the network identity information and the timing information from the beacon to join the HomeRF network. However, before the new device attempts to join the HomeRF network based on the beacon information, the user is informed via a display message etc., about the existence of a HomeRF network and the types of services that are available (block 178). Accordingly, the user may either approve or disapprove joining the HomeRF network for the specified services (block 180). If the user directs the dual-mode controller to establish a connection with the HomeRF network, the dual-mode device then joins the HomeRF network and maintains connection (block 182) until the device transitions into an idle mode (block 186) or until the CP beacon is no longer received by the unit (block 184). In both cases, the dual mode device goes into the dual-mode standby mode 170. If the user does not approve connecting to a HomeRF network, the dual-mode controller automatically starts an inquiry scan procedure to search for the existence of a Bluetooth network (block 188). As illustrated in FIG. 10, the dual-mode controller jumps to the same state 188, that is, starting a Bluetooth inquiry scan if the initial HomeRF network scan fails to find a CP beacon. In this case, the Bluetooth inquiry scan procedure is also run for 10.24 seconds. This time duration is divided into four inquiry scan periods of each 2.56 seconds. As shown in FIG. 9, the inquiry scan procedure involves searching for a valid inquiry code for 11.25 msec (covering 16 inquiry frequencies) in a 2.56 second interval at a single hop frequency. The same procedure is repeated at different hop frequencies until an inquiry code is received, but no more than 3 times. If a valid Bluetooth inquiry code is not received within the 10.24 second interval (block 190), the dual-mode device goes back to the dual-mode standby mode 170. In case the unit receives a valid inquiry code (block 190), it goes into an inquiry-response mode 192 followed by the connection set up procedure 194 with the master as described earlier in the text. Finally, if there is no more data to be sent, the Bluetooth connection is terminated (block 196), and the dual-mode device goes back into the dual-mode standby mode 170.

The embodiment described above typically would be implemented in one or more integrated circuits. For example the section including the baseband processors, 134 and 136, the central processing unit 142 and the host interfaces 138 and 140 may be implemented in a single CMOS integrated circuit and the RF section may be implemented in a single integrated circuit. It should be appreciated, however, that the teachings of the invention may be implemented using a wide variety of electronic components and, typically, software programs.

As in the embodiments of FIGS. 2–5, the operations of the dual mode controller may be implemented using various combinations of hardware and software. Hence, operations of the state machine of FIG. 10 may be implemented using software code running on a processor or as hardware-based logic. For example, a network scanner component or routing may be used for the network scan operations. A connection manager component or routine may be used for the connection procedure. Note that these two operations may correspond with the network detector 92 and the connection manager 102 of FIG. 4.

In addition, a dual-mode communication device incorporating this embodiment may include various optional user interfaces such as an audio interface and a visual interface for textual, graphical and video presentations. The device also includes an interface for user input (e.g., a keypad). The host interface may interface to a broadband backbone including, for example, an ethernet connection, satellite connection, wireless broadband, cable or the public switched telephone network (PSTN). Typical implementations of such a device may include, for example, PDAs, cellular telephones, MP3 players, still and video cameras and video recorders.

Figure 11:
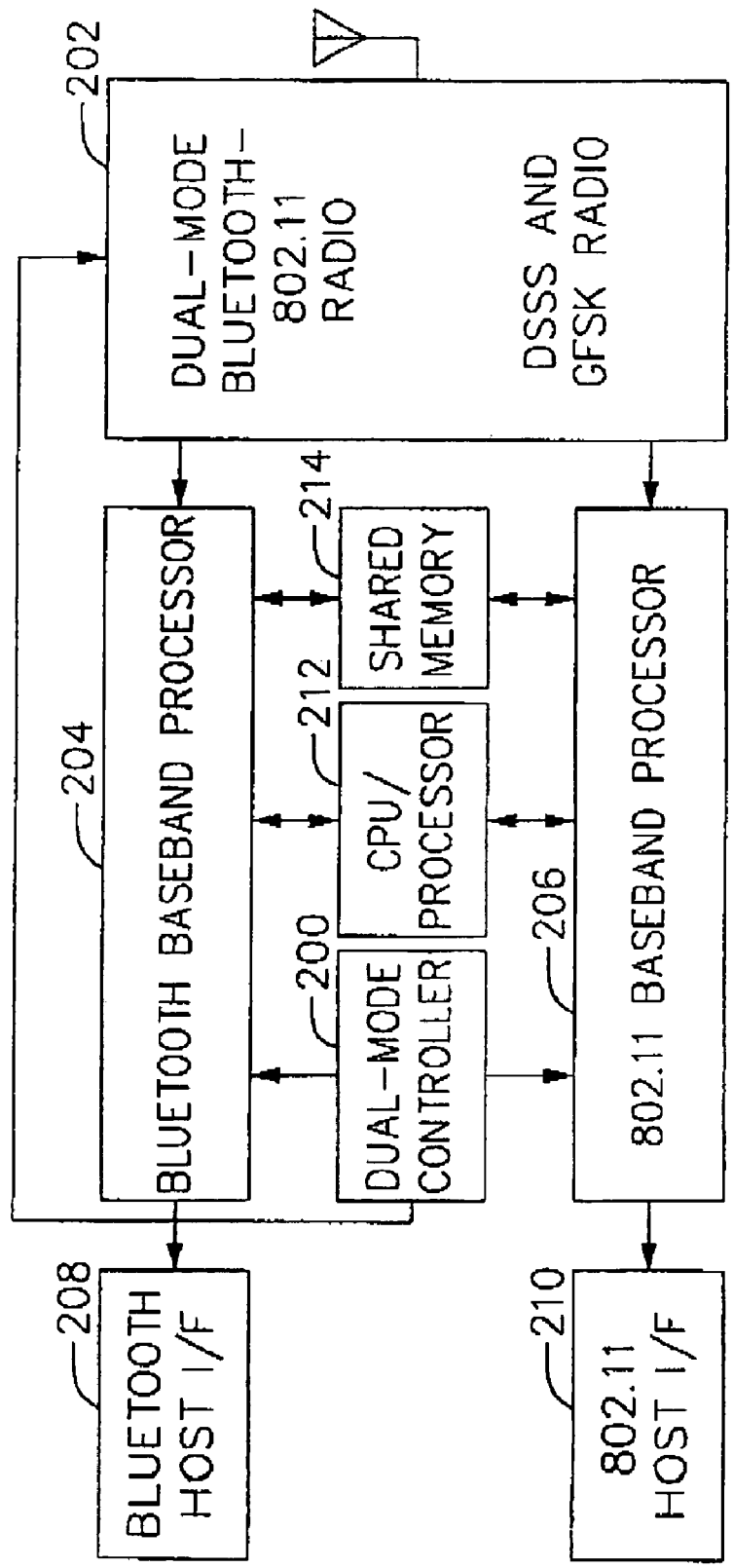
FIG. 11 is a block diagram of one embodiment of a dual mode Bluetooth and IEEE 802.11b radio transmitter/receiver constructed in accordance with the invention.

FIG. 11 depicts one embodiment of the invention consisting of a dual-mode mobile communication device that is capable of accessing either a Bluetooth or a Point-Controller (PC) controlled IEEE 802.11b network. 802.11b networks fall under the category of a local area network (LAN). Conventional 802.11b devices support data transfer rates on the order of 5.5 Mbits/s and 11 Mbit/s.

This embodiment is described in the context of a residential gateway (e.g. a cable modem with an 802.11b wireless LAN interface) providing a multi-user broadband internet access service and multi-channel cordless telephony via an 802.11b interface. A PDA or a mobile phone with a dual-mode Bluetooth-802.11b capability could switch to an 802.11b mode upon entering a home to take advantage of the broadband internet access service, or multi-channel cordless telephony service to avoid air-time charges while making a call.

In FIG. 11, a chip architecture that provides this dual-mode functionality is illustrated. A dual-mode radio front-end 202 can be shared with different RF front-end and modulation rate parameters between Bluetooth and 802.11b modes of operation. To achieve a dual-mode operation, a new timing mechanism (and respective state machines) is required since both Bluetooth and 802.11bsystems are time-synchronous networks. A dual-mode controller 200 as shown in FIG. 11 implements this timing mechanism and the state machines to achieve the dual-mode operation.

The dual-mode controller 200 has the following operational modes:
Bluetooth-only mode
802.11b-only mode
Dual Bluetooth-802.11b mode In this embodiment, all three modes are set by an external user command. In the Bluetooth-only or 802.11b-only mode, the device operates in the native Bluetooth or 802.11b mode, respectively, i.e., whichever mode the device is in the other mode would be turned off. In the dual Bluetooth-802.11b mode, Bluetooth and 802.11b baseband processors 204 and 206, respectively, time-share the dual-mode radio front-end 202 under the time-synchronous management of the dual-mode controller 200.

Figure 12:
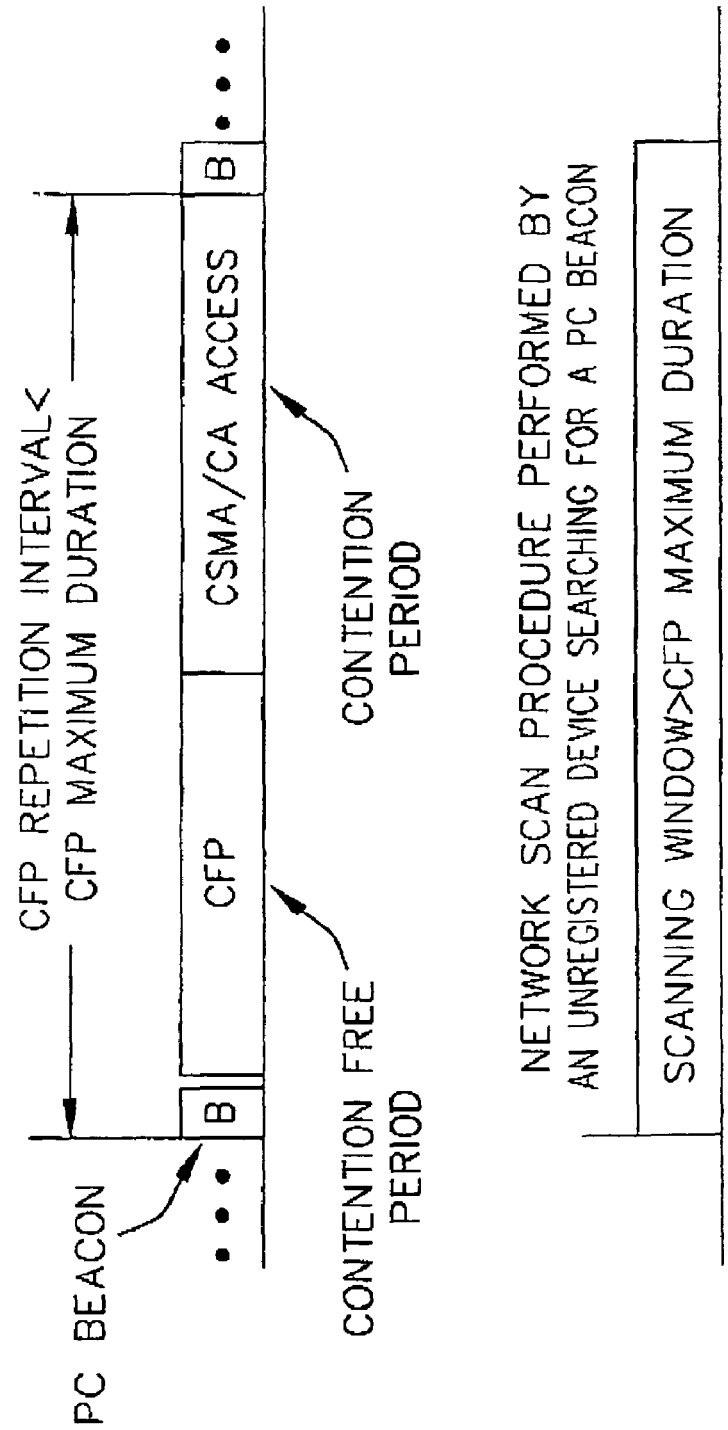
FIG. 12 is a graphical representation of a IEEE 802.11b network access procedure.

FIG. 12 describes the 802.11b network scan procedure for a new device to join an 802.11b network managed by a Point Controller (PC) device. In this case, the PC transmits a distinctive "beacon" every "CFP_(Contention Free Period) _Repetition_Interval" that is bounded by "CFPMaximumDuration" parameter per IEEE 802.11b MAC specification. Unlike in an HomeRF network, 802.11b transmissions take place at the same fixed carrier frequency, i.e., no frequency hopping is allowed. The beacon contains specific information about the existing 802.11b network.

A new device with an intention to join the 802.11b network performs a network scan procedure to search for a PC beacon. Search for the PC beacon is repeated every "CFPMaximumDuration" interval per IEEE 820.11 MAC specification at the same carrier frequency. If a PC beacon is received within the scanning window, the new device then extracts the network identity information and the timing information from the beacon to join the 802.11b network.

Figure 13:
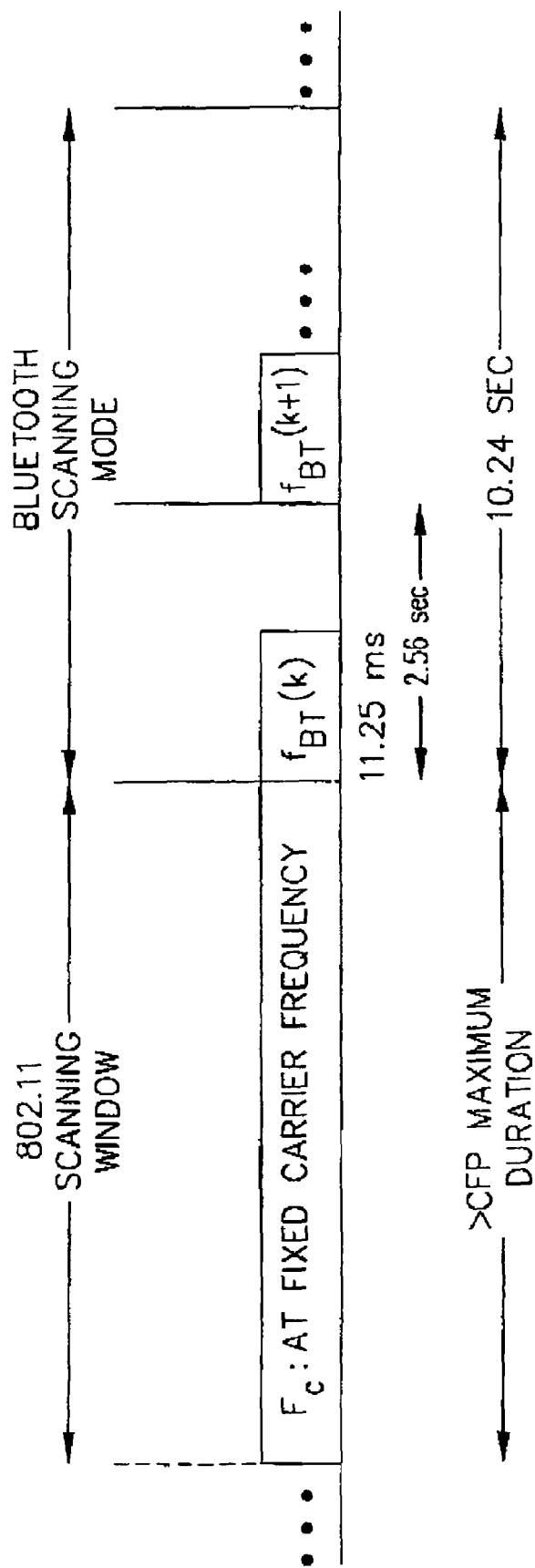
FIG. 13 is a graphical representation of one embodiment of a dual-mode Bluetooth and IEEE 802.11b network access procedure in accordance with the invention.

For a dual-mode Bluetooth-802.11b communication device, the dual-mode controller 200 manages the network access mechanism for both Bluetooth and 802.11b networks in a synchronous manner. A general illustration of the time interleaved access procedure is shown in FIG. 13.

Figure 14:
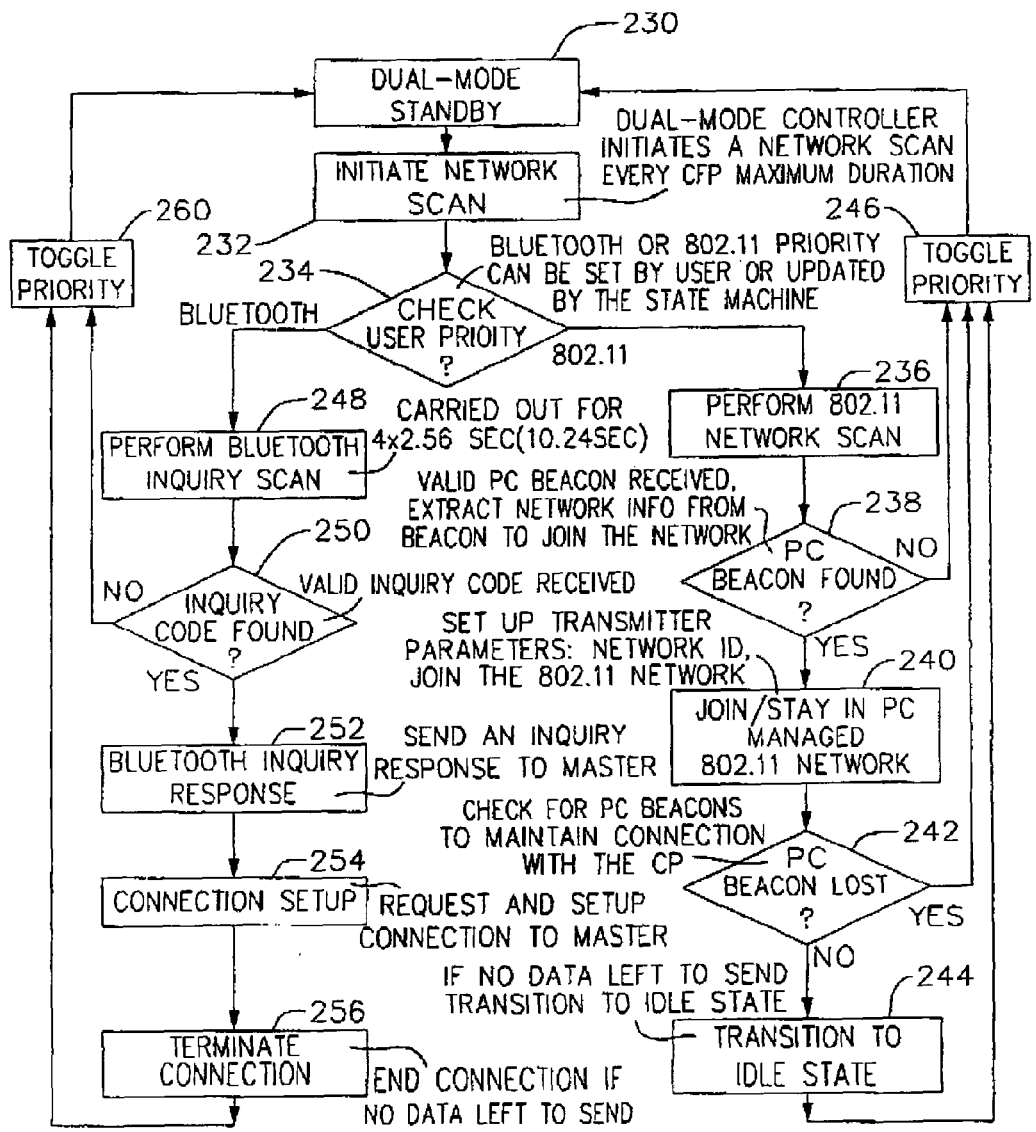
FIG. 14 is a flowchart representative of one embodiment of a Bluetooth and IEEE 802.11b dual-mode controller state transition diagram in accordance with the invention.

The dual-mode controller 200 includes a synchronous state machine that combines the standby, inquiry scan, network scan, and connection procedures carried out by Bluetooth and 802.11b_devices. It is important that dual-mode Bluetooth-802.11b devices interoperate with standards based Bluetooth-only or 802.11b-only devices. Network scan and connection setup procedures for a dual-mode device should follow the same rules as specified in the Bluetooth or 802.11b standards. In other words, dual-mode operation should not alter the synchronous time flow of interdependent states (idle, network scan, scan response, etc.) that accomplish the respective network access procedures for Bluetooth or 802.11b networks. Consequently, the objective of this invention disclosure is to devise a dual-mode controller such that Bluetooth and 802.11b network access state machines are combined without individually altering their functionalities. A description of one of the embodiments of the dual-mode controller state machine is illustrated in FIG. 14.

The default state for the dual-mode controller is the standby mode 230. In the absence of any network connection, the dual-mode controller initiates a new network scan request 232 every "CFPMaximumDuration" per 802.11b MAC specification. The very first network scan performed by the dual-mode controller searches for an 802.11b network (block 234). In this state, a new device performs a network scan procedure 236 searching for a 802.11b PC beacon. Total duration of the HomeRF network scan procedure is "CFPMaximumDuration". If a TDMA beacon is received within the scanning window (block 238), the new unit extracts the network identity information and the timing information from the beacon to join the 802.11b network. However, before the new device attempts to join the 802.11b network based on the beacon information, the user is informed via a display message etc. about the existence of the 802.11b network and the types of services that are available. Accordingly, the user may either approve or disapprove joining the 802.11b network for the specified services (block 240). If the user directs the dual-mode controller to establish a connection with the 802.11b network, the dual-mode device then joins the 802.11b network and maintains connection until the device transitions into an idle mode 244 or until the PC beacon is no longer received by the unit 242. In both cases, the dual mode device goes into the dual-mode standby mode 230. If the user does not approve connecting to the 802.11b network, the dual-mode controller automatically starts an inquiry scan procedure to search for the existence of a Bluetooth network 248. As illustrated in FIG. 14, the dual-mode controller jumps to the same state 248, that is, starting a Bluetooth inquiry scan if the initial 802.11b network scan fails to find a PC beacon. In this case, the Bluetooth inquiry scan procedure is run for 10.24 seconds. This time duration is divided into four inquiry scan periods of each 2.56 seconds. As shown in FIG. 13, the inquiry scan procedure involves searching for a valid inquiry code for 11.25 msec (covering 16 inquiry frequencies) in a 2.56 second interval at a single hop frequency. The same procedure is repeated at different hop frequencies until an inquiry code is received but no more than 3 times. If a valid Bluetooth inquiry code is not received within the 10.24 second interval, the dual-mode device goes back to the dual-mode standby mode. In case the unit receives a valid inquiry code 250, it goes into an inquiry-response mode 252 followed by the connection set up procedure 254 with the master as described earlier in the text. Finally, if there is no more data to be sent, the Bluetooth connection is terminated 256, and the dual-mode device goes back into the dual-mode standby mode 230.

While the embodiments described above generally have described portable devices, the invention may be incorporated in non-portable devices. For example, a multi-mode controller may be implemented in a stationary device in an area where the wireless services may change over time. Typical scenarios may include where the quality of service or effective data rate of a given wireless service varies over time. In general, in many applications wireless networking may be used in place of non-wireless connections. Hence, it should be understood that the teachings of the invention may be applied to virtually any connectivity application where there is a need to selectively utilize the services of more than one wireless network.

In summary, the invention described herein teaches improved techniques for managing and controlling network connectivity in wireless systems. While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for controlling and managing wireless network access for a wireless RF communication device, comprising the steps of:
   sequentially scanning, at a wireless RF communication device, for polling messages from a plurality of network masters of a plurality of time-synchronous RF networks to determine whether communications may be established with one of the networks;
   receiving the polling messages at the wireless RF communication device;
   selecting, in accordance with a predefined criteria, a network associated with one of the received polling messages; and
   establishing communications between the wireless communication device and the selected network.

2. The method of claim 1 wherein the wireless communication device is configured to scan a first network during a first scanning window and scan a second network during a second scanning window.

3. The method of claim 2 wherein the first scanning window comprises a first predefined time period and the second scanning window comprises a second predefined time period.

4. The method of claim 3 wherein the first predefined time period is equal to the second predefined time period.

5. The method of claim 2 comprising performing multiple scans during the first scanning window and performing multiple scans during the second scanning window.

6. The method of claim 5 wherein each of the multiple scans during each scanning window is performed for a predefined time period.

7. The method of claim 1 wherein the predefined criteria comprises a user preference.

8. The method of claim 1 wherein the predefined criteria comprises relative bandwidth.

9. The method of claim 1 wherein the predefined criteria comprises relative quality of service.

10. The method of claim 1 wherein the predefined criteria comprises relative content.

11. The method of claim 1 wherein the wireless communication device is configured to use a common portion of an RF radio front end to communication with the networks.

12. The method of claim 1 wherein sequentially scanning comprises sequentially using different radio interfaces.

13. The method of claim 1 wherein sequentially scanning comprises sequentially using communication protocols for different RF networks.

14. The method of claim 1 wherein sequentially scanning comprises sequentially using different frequency hopping and modulation rate parameters.

15. The method of claim 1 wherein sequentially scanning comprises sequentially using different baseband processors.

16. The method of claim 15 wherein the different baseband processors use a common RF radio front end to communication with different RF networks.

17. The method of claim 1 wherein sequentially scanning comprises sequentially scanning for an inquiry sequence and a beacon from an RF network.

18. A multi-mode controller for controlling and managing network access for a wireless RF communication device, comprising:
   a network detector for sequentially scanning for polling messages from a plurality of network masters of a plurality of time-synchronous RF networks to determine whether communications may be established with one of the networks and for receiving the polling messages;
   a network selector, coupled to the network detector, for selecting, in accordance with a predefined criteria, a network associated with one of the received polling messages; and
   a connection manager for establishing communications between the wireless communication device and the selected network.

19. The multi-mode controller of claim 18 wherein the network detector is configured to scan a first network during a first scanning window and scan a second network during a second scanning window.

20. The multi-mode controller of claim 19 wherein the first scanning window comprises a first predefined time period and the second scanning window comprises a second predefined time period.

21. The multi-mode controller of claim 20 wherein the first predefined time period is equal to the second predefined time period.

22. The multi-mode controller of claim 19 wherein the network detector is configured to perform multiple scans during the first scanning window and perform multiple scans during the second scanning window.

23. The multi-mode controller of claim 22 wherein each of the multiple scans during each scanning window is performed for a predefined time period.

* * * * *